US011522260B2

(12) United States Patent
Kim et al.

(10) Patent No.: US 11,522,260 B2
(45) Date of Patent: Dec. 6, 2022

(54) CAVITY FILTER

(71) Applicant: KMW INC., Hwaseong-si (KR)

(72) Inventors: Joung Hoe Kim, Hwaseong-si (KR); Sang Yoong Kim, Hwaseong-si (KR)

(73) Assignee: KMW INC., Hwaseong-si (KR)

( * ) Notice: Subject to any disclaimer, the term of this patent is extended or adjusted under 35 U.S.C. 154(b) by 55 days.

(21) Appl. No.: 17/229,869

(22) Filed: Apr. 14, 2021

(65) Prior Publication Data

US 2021/0234245 A1 Jul. 29, 2021

Related U.S. Application Data

(63) Continuation of application No. PCT/KR2019/013515, filed on Oct. 15, 2019.

(30) Foreign Application Priority Data

Oct. 15, 2018 (KR) .......................... 10-2018-0122558
Oct. 15, 2019 (KR) .......................... 10-2019-0127755

(51) Int. Cl.
*H01P 5/08* (2006.01)
*H01P 1/207* (2006.01)
(Continued)

(52) U.S. Cl.
CPC ............ *H01P 1/207* (2013.01); *H01P 1/2002* (2013.01); *H01P 1/203* (2013.01); *H01P 5/103* (2013.01);
(Continued)

(58) Field of Classification Search
CPC .. H01P 7/06; H01P 1/207; H01P 1/208; H01P 1/2082; H01P 1/2084;
(Continued)

(56) References Cited

U.S. PATENT DOCUMENTS 6,366,185 B1 * 4/2002 Keesey .................. H01P 5/085
333/260
2002/0061670 A1 5/2002 Havener et al.
(Continued)

FOREIGN PATENT DOCUMENTS

CN 1960082 A 5/2007
CN 100459317 C 2/2009
(Continued)

OTHER PUBLICATIONS

International Search Report for PCT/KR2019/013515, dated Jan. 22, 2020 and its English translation.
(Continued)

*Primary Examiner* — Stephen E. Jones
(74) *Attorney, Agent, or Firm* — Insight Law Group, PLLC; Seung Lee

(57) ABSTRACT

The present invention relates to a cavity filter and, in particular, provides an advantage of preventing performance deterioration of an antenna device by efficiently absorbing an assembly tolerance which may occur due to assembly design and preventing an interruption of an electrical flow, by comprising: an RF signal connecting part provided to be spaced apart at a predetermined distance from an external member having an electrode pad formed on one surface thereof; a terminal part which electrically connects the electrode pad of the external member to the RF signal connecting part, while absorbing an assembly tolerance existing within the predetermined distance and simultaneously preventing an interruption of an electrical flow between the electrode pad and the RF signal connecting part; a dielectric body which is inserted into a terminal insertion hole so as to surround the outside of the terminal part; and an elastic member which has a portion of the edge supported by the dielectric body and which elastically supports the terminal part by means of an operation in which a hollow
(Continued)

part is deformed in the vertical direction when an assembly force is transmitted to the terminal part supported to pass through the hollow part, wherein the terminal part comprises one terminal brought into contact with the electrode pad and the other terminal connected to the RF signal connecting part.

15 Claims, 12 Drawing Sheets

(51) Int. Cl.
  *H01P 1/20* (2006.01)
  *H01P 1/203* (2006.01)
  *H04B 7/0413* (2017.01)
  *H01P 5/103* (2006.01)
  *H01P 7/06* (2006.01)
  *H01R 13/6473* (2011.01)

(52) U.S. Cl.
  CPC ............ *H01P 7/06* (2013.01); *H04B 7/0413* (2013.01); *H01R 13/6473* (2013.01)

(58) Field of Classification Search
  CPC .......... H01P 1/2086; H01P 1/209; H01P 1/20; H01P 1/2002; H01P 1/203; H01P 1/201; H01P 5/08; H01P 5/087; H01P 5/1022; H01P 5/103; H01P 5/085; H01P 5/107; H04B 7/0413; H01R 13/6485
  See application file for complete search history.

(56) References Cited

U.S. PATENT DOCUMENTS

| | | | | |
|---|---|---|---|---|
| 2008/0258848 | A1* | 10/2008 | Quan | H01P 5/107 |
| | | | | 333/260 |
| 2013/0171868 | A1 | 7/2013 | Gessford et al. | |
| 2015/0061794 | A1* | 3/2015 | Tong | H01R 13/5219 |
| | | | | 333/260 |
| 2017/0077573 | A1* | 3/2017 | Yuan | H01P 1/207 |

FOREIGN PATENT DOCUMENTS

| | | |
|---|---|---|
| CN | 201450195 U | 5/2010 |
| CN | 102136616 A | 7/2011 |
| CN | 103066350 A | 4/2013 |
| CN | 203039049 U | 7/2013 |
| CN | 105474477 A | 4/2016 |
| CN | 108448213 A | 8/2018 |
| CN | 108448215 A | 8/2018 |
| EP | 3809519 A1 | 4/2021 |
| JP | H08335483 A | 12/1996 |
| KR | 10-2018-0089265 A | 8/2018 |
| WO | 2018143614 A1 | 8/2018 |

OTHER PUBLICATIONS

Chinese office action dated Mar. 21, 2022 for Chinese Application No. 201980068198.8.
Extended European Search Report dated Jun. 14, 2022 for European Application No. 19873088.9.
Japanese office action dated Apr. 19, 2022 for Japanese Application No. 2021-545344.

* cited by examiner

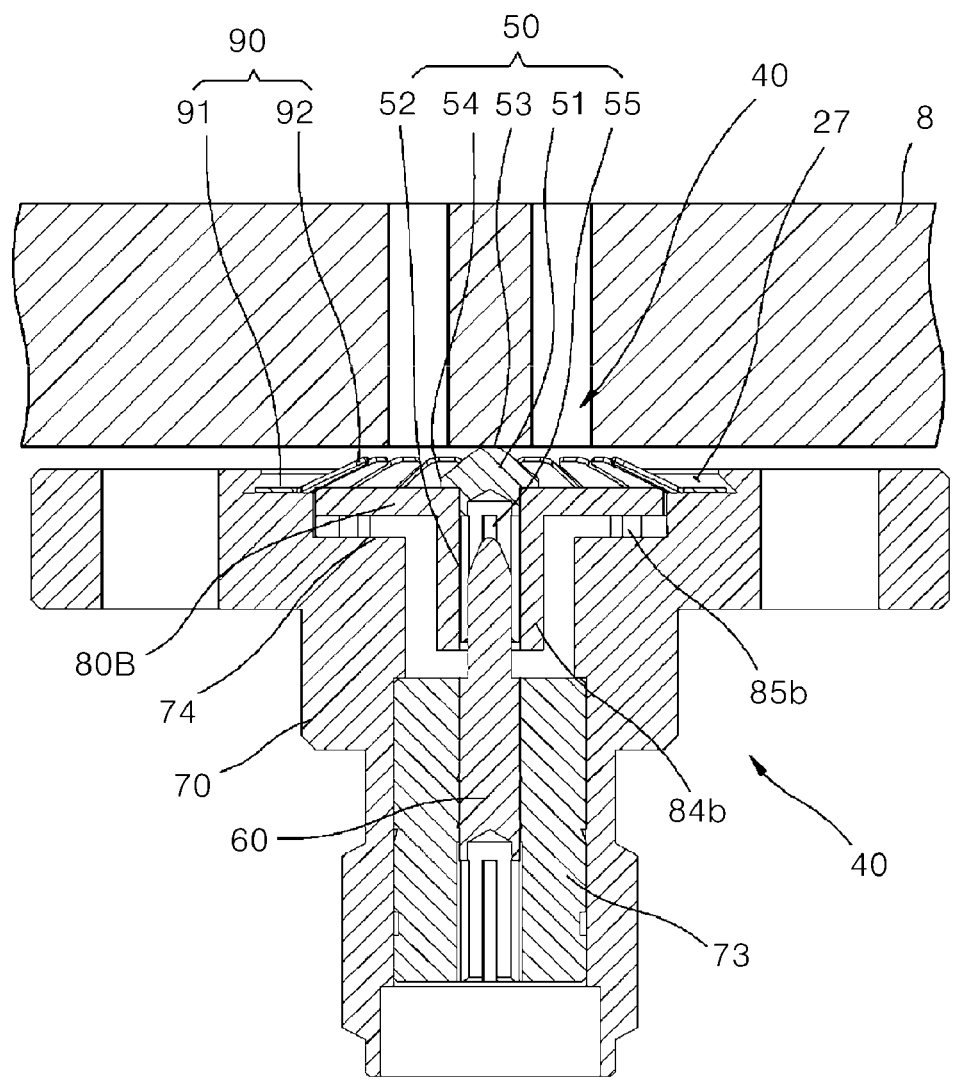

CAVITY FILTER

TECHNICAL FIELD

The present disclosure relates to a cavity filter, and more particularly, to a cavity filter for Massive MIMO antennas, which is fastened to a printed circuit board through an improved connector structure in consideration of the assembly and size of the cavity filter.

BACKGROUND ART

This section merely provides background information related to the present disclosure that is not necessarily prior art.

Multiple-input multiple-output (MIMO) is a technology that dramatically increases data transmission capacity by means of multiple antennas and that employs a spatial multiplexing scheme in which transmitters transmit different types of data through individual transmit antennas and receivers separate the transmitted data through appropriate signal processing. Accordingly, as the number of transmit/receive antennas is increased simultaneously, it is possible to transmit more data through an increase in channel capacity. For example, if 10 antennas are used, a channel capacity of approximately 10 times is achieved in the same frequency band, compared to a current single antenna system.

A 4G LTE-advanced network uses up to 8 antennas, and products equipped with 64 or 128 antennas are currently being developed for a pre-5G network. A 5G network expects to use base station equipment with a much larger number of antennas, which is called Massive MIMO. Although cell operation is currently implemented in a 2-dimensional manner, 3D-beamforming becomes possible by introduction of Massive MIMO. Accordingly, the Massive MIMO is also called full dimension MIMO (FD-MIMO).

In the Massive MIMO, as the number of antenna elements increases, the number of transceivers and filters increases as well. As of 2014, more than 200,000 base stations have been installed nationwide in Korea. Accordingly, a cavity filter structure is required to minimize a mounting space and facilitate mounting, and an RF signal line connection structure is required to allow cavity filters, which are individually tuned, to provide the same filter characteristics even after being mounted to antennas.

A cavity-structured RF filter includes a resonator composed of a resonant rod, as a conductor, and the like, inside a box structure formed of a metallic conductor, which allows only an electromagnetic field having a natural frequency to exist therein, so that only characteristic frequencies such as ultra-high frequencies pass through the filter by resonance. Such a cavity-structured bandpass filter is widely utilized as a filter for mobile communication base station antennas since it has a low loss of insertion and is advantageous for high power.

DISCLOSURE

Technical Problem

An object of the present disclosure is to provide a cavity filter having a slimmer and more compact structure and equipped with an RF connector in a thickness direction in a body thereof.

Another object of the present disclosure is to provide a cavity filter having an RF signal connection structure that is easy to mount and keeps filter's frequency characteristics uniform while ensuring an assembly method capable of minimizing a cumulative amount of assembly tolerances caused when assembling a plurality of filters.

A further object of the present disclosure is to provide a cavity filter capable of preventing an occurrence of signal loss by adding lateral tension while allowing relative movement in the case of a separable RF pin.

The present disclosure is not limited to the above-mentioned objects, and other objects of the present disclosure can be clearly understood by those skilled in the art to which the present disclosure pertains from the following description.

Technical Solution

According to an aspect of an exemplary embodiment, there is provided a cavity filter that includes an RF signal connector spaced apart at a predetermined distance from an external member having an electrode pad on one surface thereof, a terminal section configured to electrically connect the electrode pad of the external member to the RF signal connector and to absorb an assembly tolerance existing at the predetermined distance while preventing an interruption of electrical flow between the electrode pad and the RF signal connector, a dielectric body inserted into a terminal insertion port to surround the terminal section, and an elastic member having an edge whose portion is supported by the dielectric body, the elastic member being configured to elastically support the terminal section by means of an operation in which a hollow portion of the elastic member is vertically deformed relative to the portion of the edge when an assembly force is applied to the terminal section supported to pass through the hollow portion, wherein the terminal section includes one terminal coming into contact with the electrode pad, and the other terminal connected to the RF signal connector.

The terminal section may be inserted into the terminal insertion port formed in a filter body having the RF signal connector therein through the dielectric body.

The dielectric body may include an upper inner dielectric provided to surround a portion of an outer peripheral surface of the one terminal passing through a terminal installation hole provided as a hollow space, and a lower inner dielectric provided to surround a portion of an outer peripheral surface of the other terminal passing through the terminal installation hole.

The dielectric body may include one of a second elastic member installation end formed to be larger than a diameter of a peripheral hole to support the edge of the elastic member, and a first elastic member installation end stepped to be larger than a diameter of the second elastic member installation end.

The elastic member may include a first elastic member in the form of a disk, the first elastic member including a hollow portion, a plurality of outer edges supported by one of the first and second elastic member installation ends, and a plurality of inner edges to which the one terminal of the terminal section is latched, and a second elastic member in the form of a disk, the second elastic member including an elastic part having a hollow portion and a plurality of lower support ends supported by one of the first and second elastic member installation ends, and a boss extending downward from the elastic part so as to surround the outer peripheral surface of the one terminal of the terminal section passing through the hollow portion.

The first elastic member may be configured such that the outer and inner edges are separable by outer cuts, each formed by cutting a predetermined length toward the hollow portion from an outer peripheral surface of the first elastic member, and inner cuts, each formed by cutting a predetermined length toward the outer peripheral surface from the hollow portion, respectively.

The first elastic member may be configured such that the outer edges are bent outward with respect to the inner edges.

The second elastic member may be elastically deformable by a plurality of inner elastic cuts circumferentially arranged and each vertically formed around the hollow portion and a plurality of outer elastic cuts circumferentially arranged and each vertically formed around the inner elastic cuts.

The elastic member may be made of one of beryllium copper (BeCu), stainless steel (SUS), and spring steel.

Either of the one terminal and the other terminal may include a plurality of tension cuts vertically elongated.

The tension cuts may be provided in the one terminal, and an upper end of the other terminal may be accommodated in a lower end of the one terminal.

The tension cuts may be provided in the other terminal, and a lower end of the one terminal may be accommodated in an upper end of the other terminal.

The dielectric body may support an outer peripheral surface of the one terminal or the other terminal in which the tension cuts are formed.

A contact portion of the one terminal of the terminal section, which is in contact with the electrode pad, may have a rounded conical shape to have a predetermined contact area at its upper end.

A contact portion of the one terminal of the terminal section, which is in contact with the electrode pad, may have a rounded hemispherical shape to have a predetermined contact area at its upper end.

Advantageous Effects

A cavity filter according to exemplary embodiments of the present disclosure can achieve various effects as follows.

First, since an RF connector in a thickness direction in a body, it is possible to design a slimmer and more compact structure.

Second, it is possible to design an RF signal connection structure that is easy to mount and keeps filter's frequency characteristics uniform while ensuring an assembly method illustrating an of minimizing a cumulative amount of assembly tolerances caused when assembling a plurality of filters.

Third, it is possible to prevent antenna performance degradation since stable connection is possible by adding lateral tension while allowing relative movement.

Fourth, since an elastic member for eliminating an assembly tolerance is made of one of beryllium copper, stainless steel, and spring steel, it is possible to prevent a deterioration in reliability due to compression reduction ratio.

DESCRIPTION OF DRAWINGS

FIG. 12 is a partial cross-sectional view of FIG. 3 where the elastic member of FIG. 11 is provided.

Figure 1:
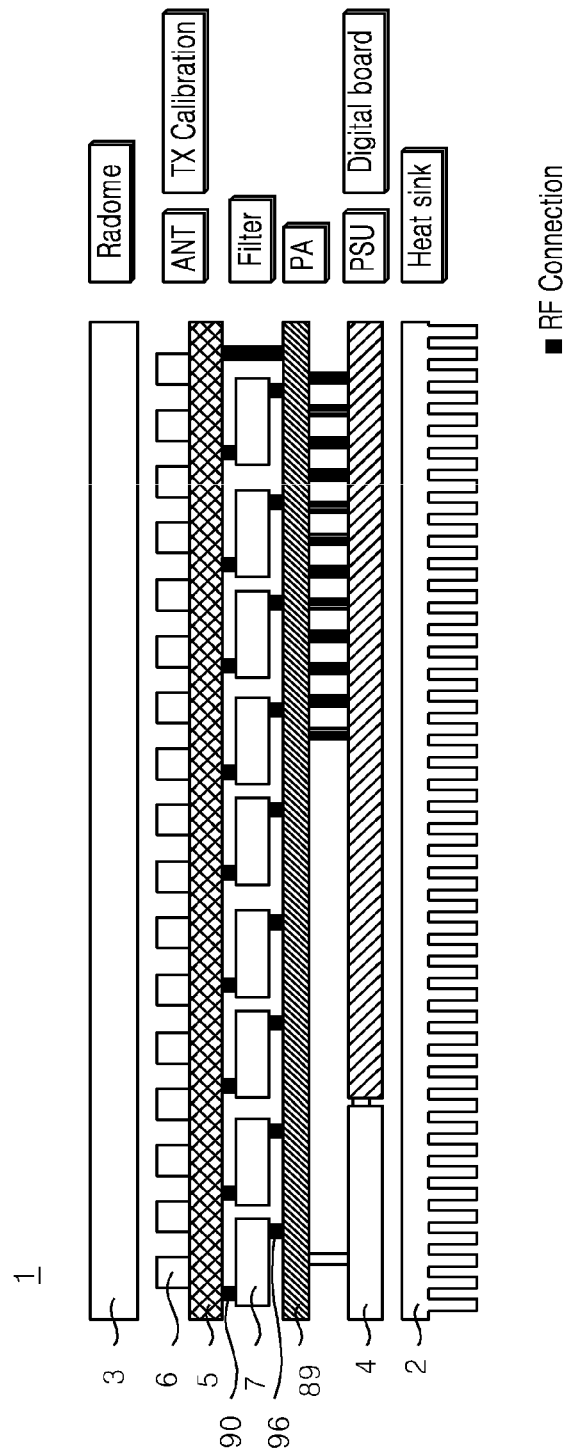
FIG. 1 is a diagram illustrating an exemplary stacked structure of Massive MIMO antennas.

| [List of Reference Numerals] | |
|---|---|
| 20: cavity filter | 21: filter body |
| 25: terminal insertion port | 27: washer installation part |
| 30: filter module | 31: RF signal connector |
| 40: terminal section | 50: one terminal |
| 60: the other terminal | 70: dielectric body |
| 72: upper inner dielectric | 73: lower inner dielectric |
| 74: second elastic member installation end | 77: terminal installation hole |
| 78: first elastic member installation end | 80A, 80B: elastic member |
| 81a, 81b: hollow portion | 82a: outer cut |
| 83a: inner cut | 84a: outer edge |
| 85a: inner edge | |

BEST MODE

Reference will now be made in detail to exemplary embodiments of the present disclosure, examples of which are illustrated in the accompanying drawings.

It should be noted that reference numerals are added to the components of the accompanying drawings to facilitate understanding of the embodiments described below and the same reference numbers will be used throughout the drawings to refer to the same or like parts wherever possible. In certain embodiments, detailed descriptions of constructions or functions well known in the art may be omitted to avoid obscuring appreciation of the disclosure by a person of ordinary skill in the art.

The terms such as "first", "second", "A", "B", "(a)", and "(b)" may be used herein to describe components in the embodiments of the present disclosure. These terms are not used to define an essence, order or sequence of a corresponding component but used merely to distinguish the corresponding component from other component(s). Unless otherwise defined, all terms, including technical and scientific terms, used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

FIG. 1 is a diagram illustrating an exemplary stacked structure of Massive MIMO antennas.

FIG. 1 illustrates only an exemplary appearance of an antenna device 1 equipped with an antenna assembly including cavity filters, and does not limit the appearance of the antenna device at the time of actual stacking operation.

The antenna device 1 includes a housing 2 having a heat sink formed therein, and a radome 3 coupled to the housing 2. An antenna assembly may be provided between the housing 2 and the radome 3.

A power supply unit (PSU) 4 is coupled to the lower portion of the housing 2, for example, through a docking structure. The power supply unit 4 provides operating power to operate communication components included in the antenna assembly.

The antenna assembly typically has a structure in which a plurality of antenna elements 6 are arranged on the front surface of an antenna board 5, the same number of cavity filters 7 as the number of antenna elements 6 is arranged on the back surface of the antenna board 5, and a related PCB 8 is subsequently stacked thereon. The cavity filters 7 may be prepared to be tuned and verified in detail such that each individual cavity filter has a frequency characteristic suitable for the specifications thereof before mounting. It is preferable that such tuning and verification be performed rapidly in the same characteristic environment as the mounting.

Figure 2:
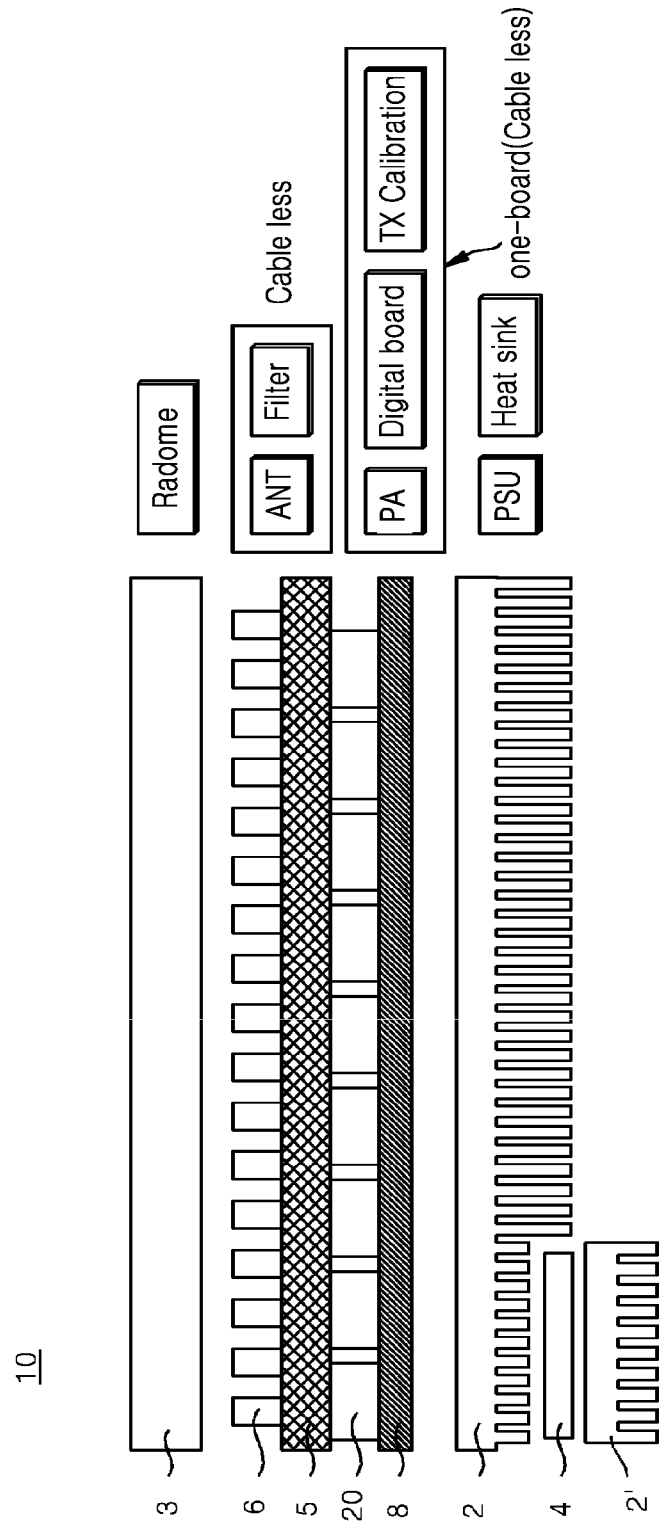
FIG. 2 is a cross-sectional diagram illustrating a state in which cavity filters are stacked between an antenna board and a control board according to an embodiment of the present disclosure.

FIG. 2 is a cross-sectional diagram illustrating a state in which cavity filters are stacked between an antenna board and a control board according to an embodiment of the present disclosure.

Referring to FIG. 2, the cavity filters, which are designated by reference numeral 20, according to the embodiment of the present disclosure may exclude typical RF connectors 90 illustrated in FIG. 1. Thus, it is possible to provide an antenna structure that makes it easier to connect and has a lower height profile.

In addition, RF connections are provided in a height direction on both sides of an antenna device and are connected by the cavity filters 20 according to the embodiment of the present disclosure. Therefore, it is advantageous to keep the RF connections constant even though vibration and thermal deformation occur in an antenna board or a PCB 8, resulting in no change in frequency characteristics.

Figure 3:
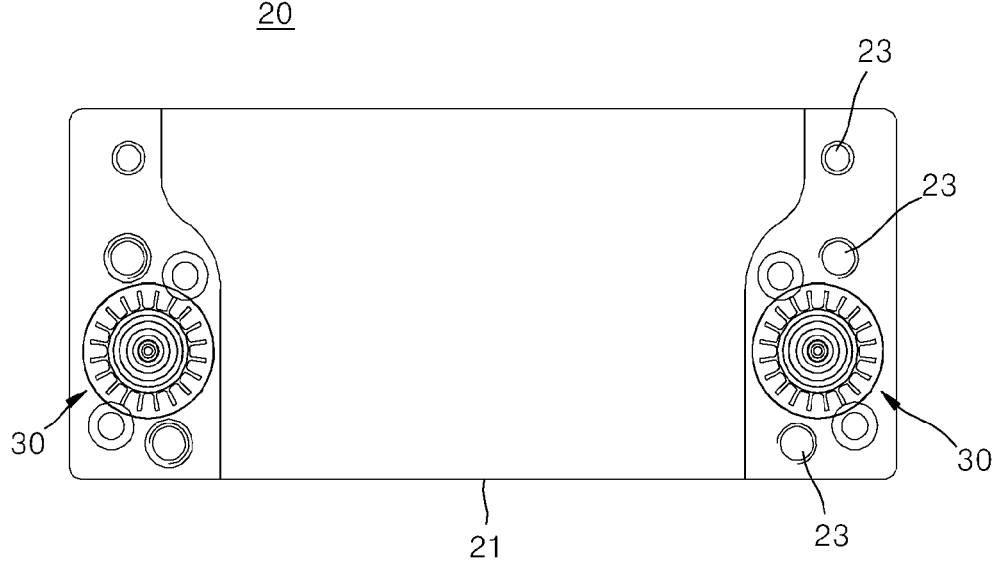
FIG. 3 is a bottom view illustrating a structure of one cavity filter according to the embodiment of the present disclosure.
Figure 4:
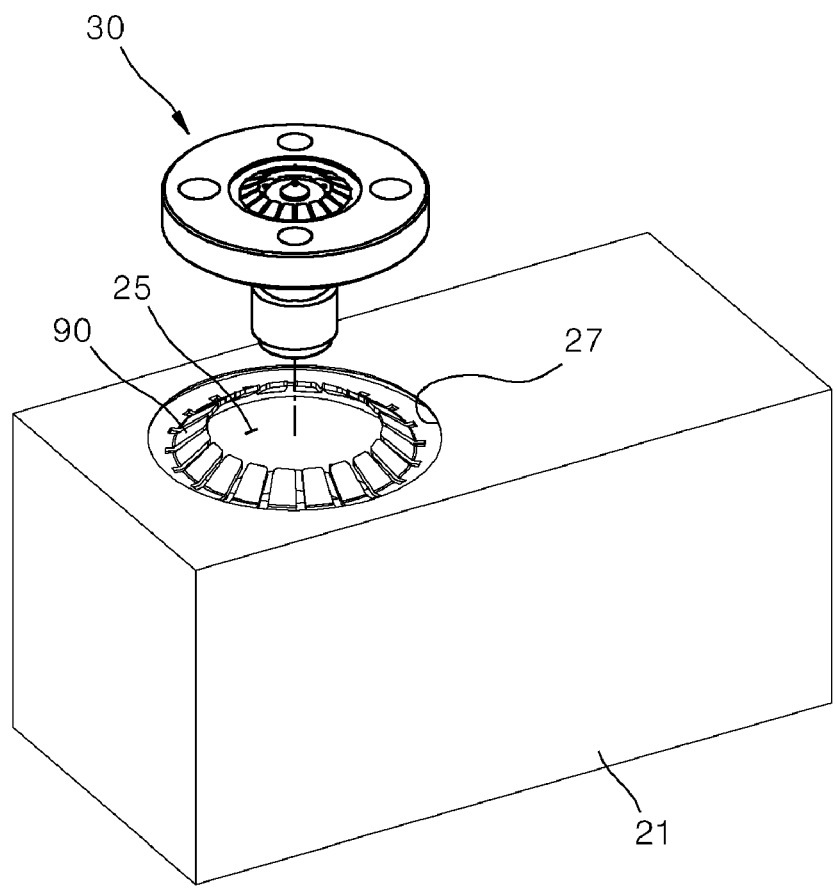
FIG. 4 is an exploded perspective view illustrating a state in which a filter module and a terminal section, as partial components of the cavity filter, are separated from each other according to the embodiment of the present disclosure.
Figure 5:
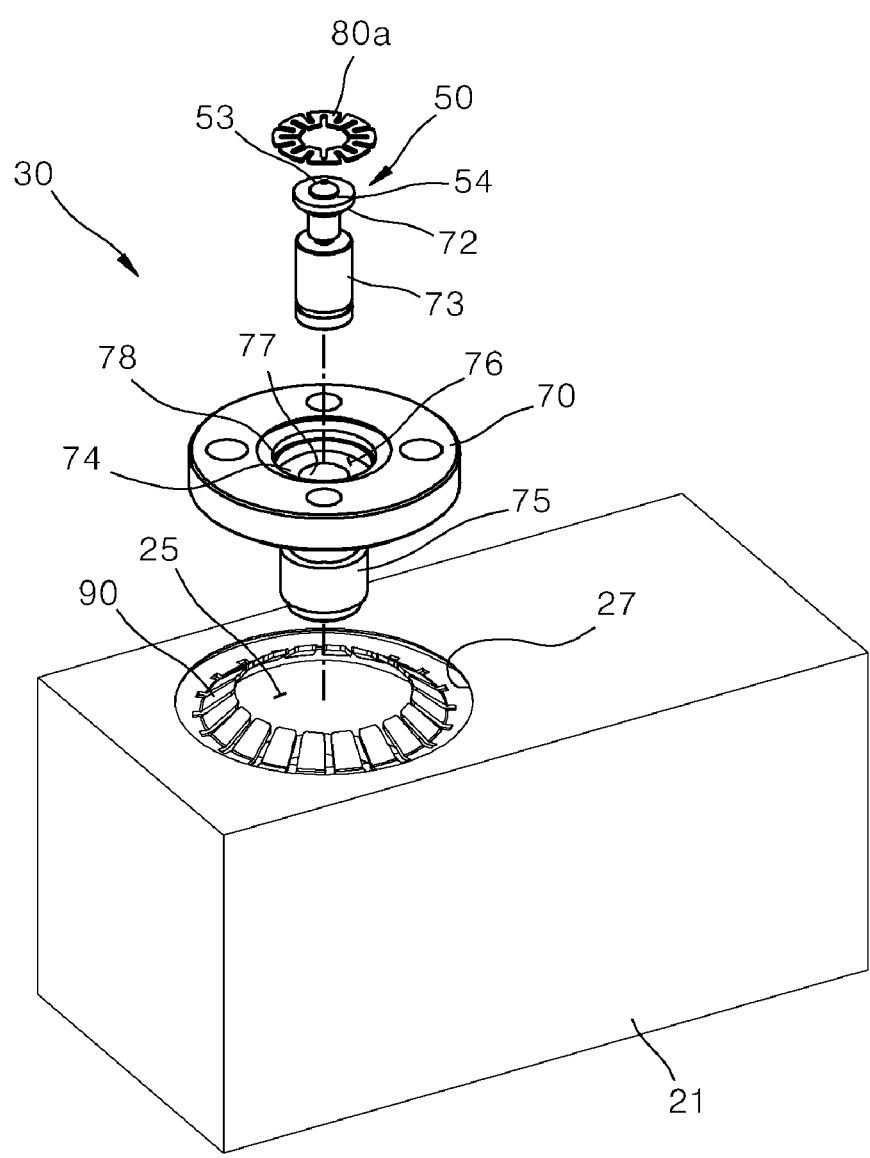
FIG. 5 is an exploded perspective view of FIG. 4.
Figure 6:
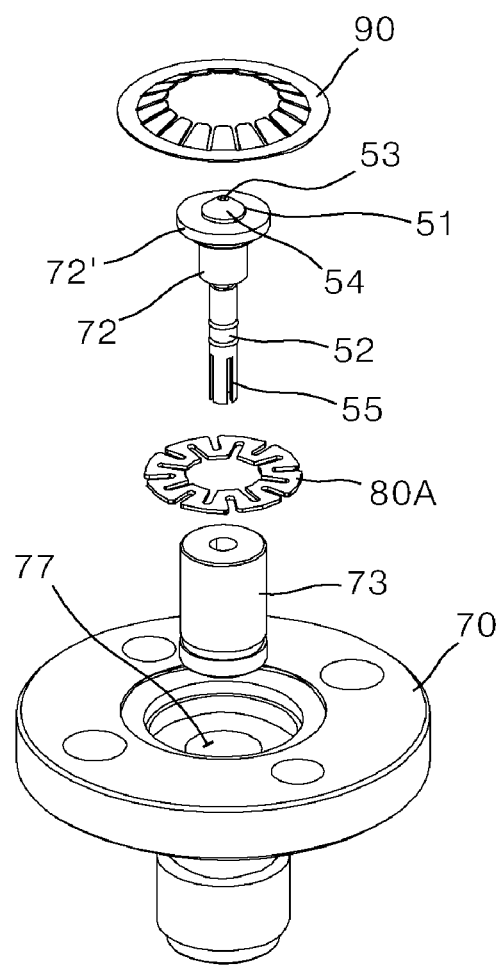
FIG. 6 is an exploded perspective view illustrating the cavity filter according to the embodiment of the present disclosure.
Figure 7A:
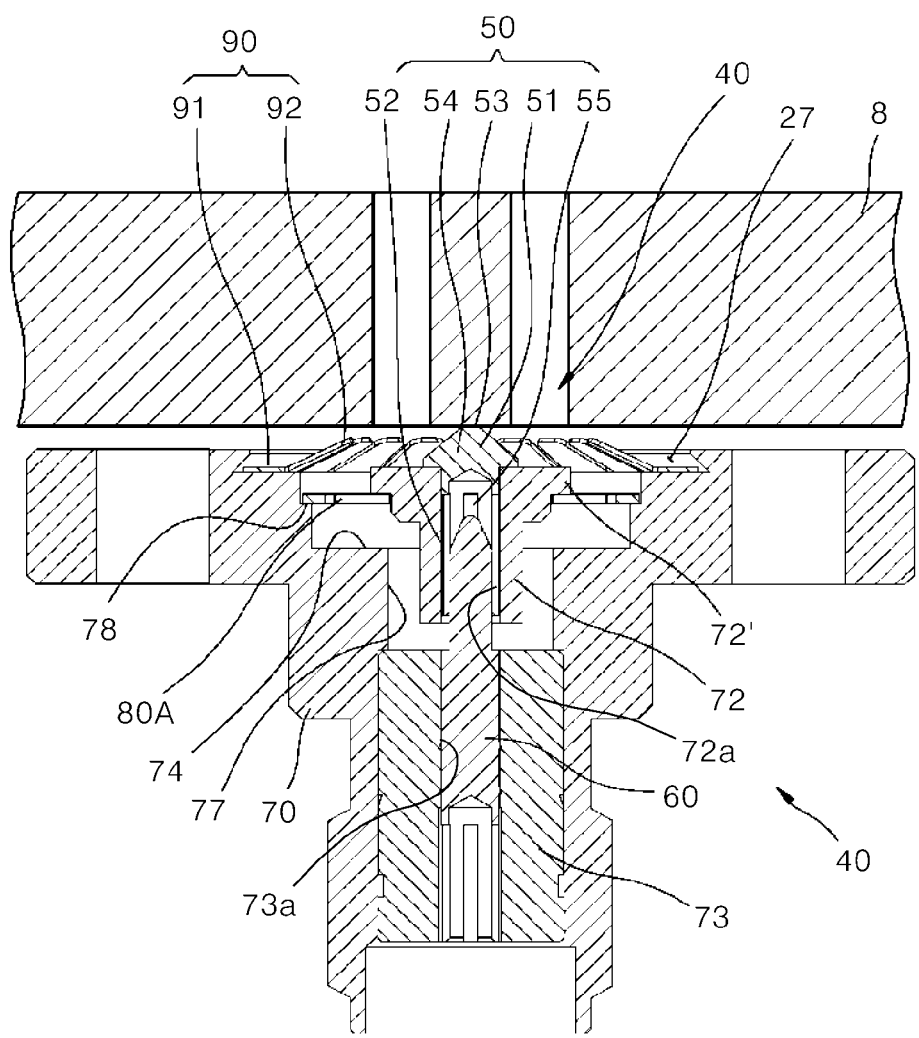
FIGS. 7A and 7B are partial cross-sectional views of FIG. 3 and illustrate states before and after bonding to a PCB.
Figure 7B:
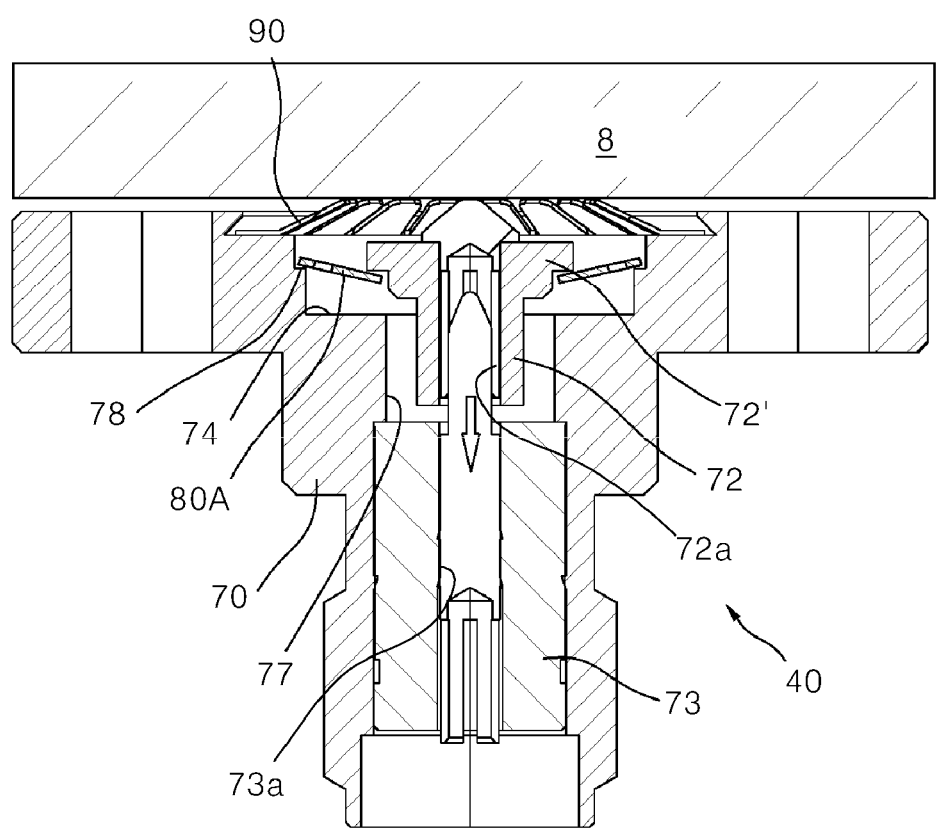
Figure 8A:
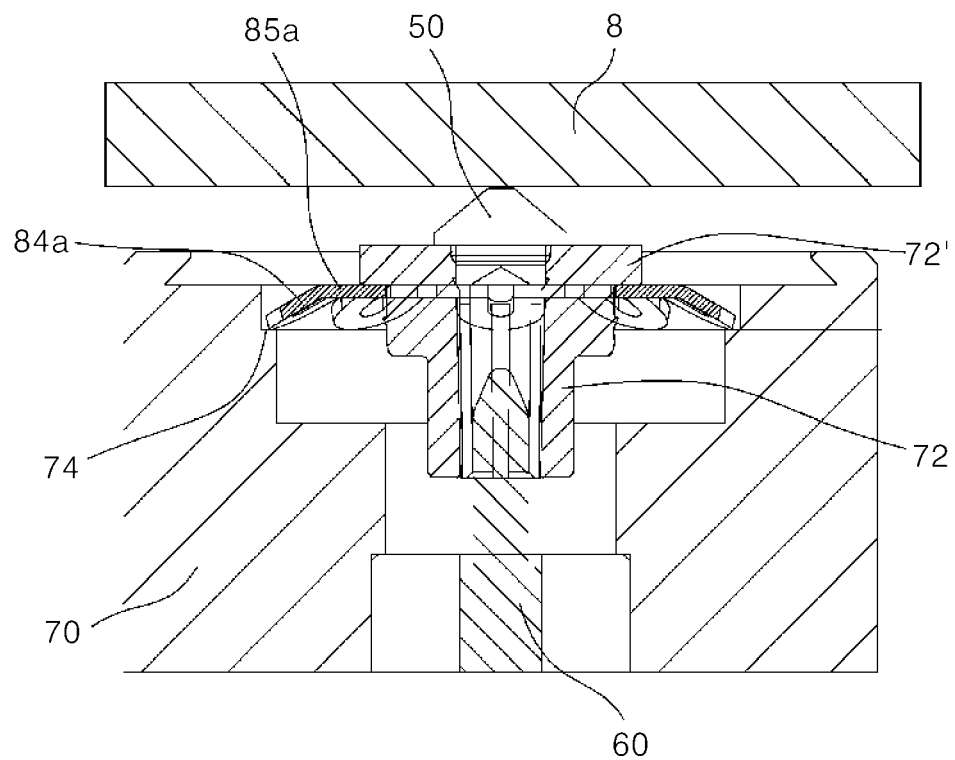
FIGS. 8A and 8B are modifications of FIGS. 7A and 7B.
Figure 8B:
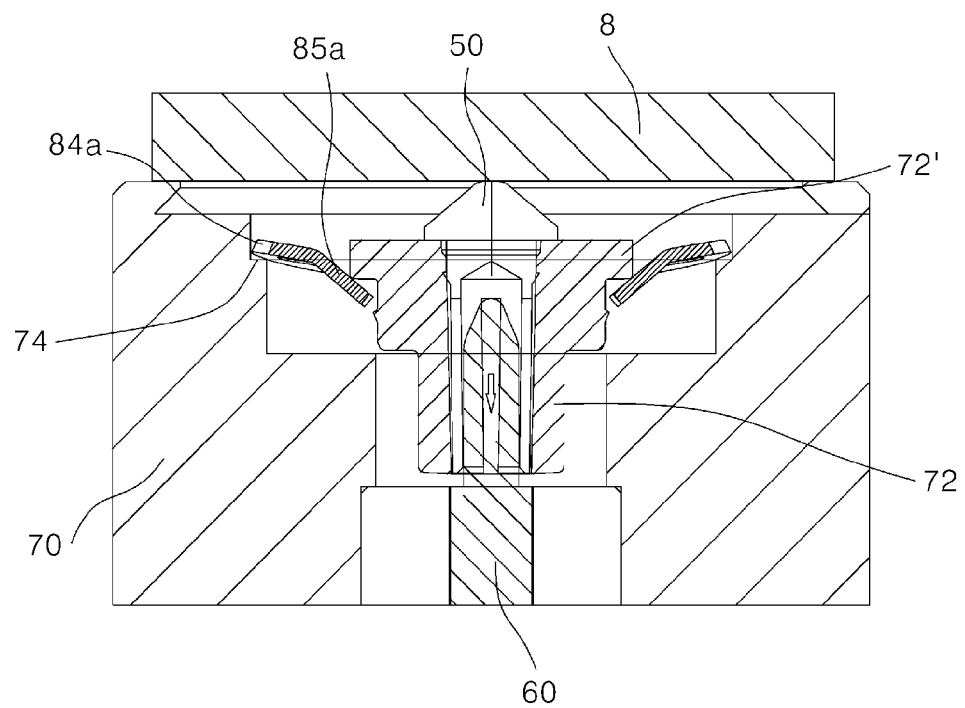

FIG. 3 is a bottom view illustrating a structure of one cavity filter according to the embodiment of the present disclosure. FIG. 4 is an exploded perspective view illustrating a state in which a filter module and a terminal section, as partial components of the cavity filter, are separated from each other according to the embodiment of the present disclosure. FIG. 5 is an exploded perspective view of FIG. 4. FIG. 6 is an exploded perspective view illustrating the cavity filter according to the embodiment of the present disclosure. FIGS. 7A and 7B are partial cross-sectional views of FIG. 3 and illustrate states before and after bonding to the PCB. FIGS. 8A and 8B are modifications of FIGS. 7A and 7B.

Referring to FIG. 3, each of the cavity filters 20 according to the embodiment of the present disclosure includes an RF signal connector 31 (see FIG. 4 and subsequent drawings), a first casing (no reference numeral) having a hollow defined therein, a second casing (no reference numeral) covering the first casing, terminal sections 40 (see FIG. 4) provided in the height direction of the cavity filter 20 on both longitudinal sides of the first casing, and a filter module 30 having assembly holes 23 provided in each of the terminal sections 40. Each of the terminal sections 40 passes through a terminal insertion port 25 provided in the first casing and electrically connects an electrode pad (no reference numeral) of an external member 8, such as an antenna board or a PCB, to the RF signal connector.

When the terminal section 40 is supported at the lower end thereof in the drawing by the RF signal connector (not shown) and is closely bonded at the upper side thereof to the antenna board or the PCB 8, the terminal section 40 may be always in contact with the external member 8 (especially, the electrode pad provided on one surface thereof) and may be elastically supported to eliminate an assembly tolerance existing in the terminal insertion port 25 of a filter body 21 to be described later.

That is, the cavity filter 20 according to the present disclosure may be implemented in specific embodiments, in which the terminal section 40 is separated into one terminal 50 and the other terminal 60, is shaped to add lateral tension, and absorbs an assembly tolerance, as described later.

In more detail, the terminal section 40 may be separated into two upper and lower members 50 and 60 (see FIG. 6), as illustrated in FIGS. 4 to 8B, and may be of a separation type in which a portion of one of the two members is inserted into a portion of the other member. In an embodiment of the present disclosure, it is adopted that a portion of the upper end of the other terminal 60 is inserted into the lower portion of one terminal 50. Of course, the opposite structure is also available.

In general, in the case that the terminal section 40 is provided as an integral filter although not illustrated in the drawings, when an assembler applies a predetermined assembly force to the terminal section 40 in order to eliminate an assembly tolerance, a constituent part of the terminal section 40 is provided as an elastic body that is elastically deformed. However, the integral filter as the terminal section 40 does not require a separate shape design for separately adding lateral tension since an interruption of electrical flow between one end and the other end of the filter is not predicted.

In contrast, in the case that the terminal section 40 is provided as a separable filter with two separated members, the assembly tolerance may be eliminated by a separate elastic member 80A/80B configured such that the entire length thereof is contractible as the separated terminals 50 and 60 are moved to overlap with each other by the above-mentioned predetermined assembly force whereas the entire length thereof is extended and restored when the assembly force is removed. However, since the terminal section 40 is separated into one terminal 50 and the other terminal 60, there is a risk of interrupting an electrical flow when the terminals are moved to overlap with each other. Therefore, either of the terminals 50 and 60 may be provided as an elastic body, or a separate shape change to add lateral tension may be necessarily required.

Here, the term "lateral tension" may be defined as a force that allows one of the terminals 50 and 60 to be directed toward the other terminal in a direction different from the longitudinal direction in order to prevent the interruption of electrical flow between one terminal 50 and the other terminal 60 as described above.

Meanwhile, due to the characteristics of the antenna device, during the design of shape change of the above terminal section 40, an impedance matching design in the terminal insertion port 25 should be performed in parallel. However, the cavity filter 20 according to the embodiments of the present disclosure will be described below on the premise that the impedance matching in the terminal insertion port 25 has been achieved. Therefore, in the configuration of the cavity filter according to the embodiments of the present disclosure described with reference to FIG. 4 and the subsequent drawings, components, such as a dielectric body 70 or a reinforcing plate, inserted together with the terminal section 40 into the terminal insertion port 25 may have different shapes according to the impedance matching design.

Referring to FIGS. 4 to 8B, the cavity filter 20 according to the embodiment of the present disclosure includes the RF signal connector spaced apart at a predetermined distance from the external member 8 having the electrode pad (no reference numeral) on one surface thereof, and the terminal section 40 configured to electrically connect the electrode pad of the external member 8 to the RF signal connector and to eliminate the assembly tolerance existing at the predetermined distance while preventing the interruption of electrical flow between the electrode pad and a resonant element.

Here, the external member 8 may be one of an antenna board or power amplifier (PA) having antenna elements arranged on the other surface thereof, a digital board, and a PCB equipped with TX calibration as an integrated one-board, as illustrated in FIG. 2.

Hereinafter, as illustrated in FIG. 3, the external configuration of the cavity filter 20 according to the embodiments of the present disclosure is not divided into the first casing and the second casing, but is collectively referred to as a filter body, which is designated by reference numeral 21, having the terminal insertion port 25. The filter body 21 may be made of a dielectric material that is easy for an impedance matching design therein (see reference numeral "70" in FIGS. 7A and 7B). Preferably, the filter body 21 may be made of Teflon.

As illustrated in FIGS. 4 to 8B, the filter body 21 may be provided with the terminal insertion port 25 in a hollow form. The terminal insertion port 25 may have a shape suitable for an impedance matching design.

A washer installation part 27 may be grooved on one surface of the filter body 21, especially, on one surface on which one terminal 50 of the terminal section 40 is provided. The washer installation part 27 may be grooved to have a larger inner diameter than a terminal installation hole 77 in order to latch the outer edge of a star washer 90 to be described later and prevent it from being separated upward.

In addition, the cavity filter 20 according to the example of the present disclosure may further include the star washer 90 that is fixedly installed in the washer installation part 27.

The star washer 90 may include a ring-shaped fixed end 91 fixed to the washer installation part 27, and a plurality of support ends 92 inclined upward toward the center of the electrode pad of the antenna board or PCB 8 from the fixed end 91.

The star washer 90 may be configured such that, when the assembler assembles the cavity filter 20 according to the embodiment of the present disclosure to the antenna board or the PCB 8, the support ends 92 are supported by one surface of the antenna board or PCB 8 while applying an elastic force against the fastening force of fastening members (not shown) through the assembly holes 23. The addition of the elastic force by the support ends 92 serves to eliminate the assembly tolerance existing between the antenna board or the PCB 8 and the cavity filter 20 according to the embodiment of the present disclosure.

However, the assembly tolerance absorbed by the star washer 90 exists in the terminal insertion port 25, and is a concept different from the assembly tolerance absorbed by the terminal section 40, as described later. That is, the cavity filter according to the embodiment of the present disclosure may be designed to absorb the overall assembly tolerance at at least two locations by separate members in a single assembly process, thereby achieving more stable bonding.

In the cavity filter 20 according to the embodiment of the present disclosure, the terminal section 40 includes one terminal 50 in contact with the electrode pad of the external member 8, and the other terminal 60 fixed to a solder hole 32 formed in a portion, extending in the form of a plate, as the RF signal connector, as illustrated in FIGS. 4 to 8B. However, the other terminal 60 is not necessarily directly solder-bonded to the RF signal connector, but may be coupled to another electrically-connected conductive member.

Here, one of the terminals 50 and 60 may be inserted into the other terminal, so that portions of the respective ends thereof may overlap with each other by a predetermined length during assembly.

The cavity filter 20 according to the embodiment of the present disclosure may have a structure in which the upper side of the other terminal 60 is inserted into the lower side of one terminal 50 in the drawings (especially, see FIGS. 7A and 7B). To this end, the lower end of one terminal 50 may be provided in the form of a hollow tube such that the upper end of the other terminal 60 is inserted into the lower end of one terminal 50.

When the terminal section 40 composed of one terminal 50 and the other terminal 60 is installed in the terminal insertion port 25, the dielectric body 70 made of a dielectric material to surround the terminal section 40 may be inserted into the terminal insertion port 25 for impedance matching therein.

The dielectric body 70 may be made of Teflon. However, the material of the dielectric body 70 is not limited to Teflon, and any material having a dielectric constant allowing impedance matching in the terminal insertion port 25 may be used for the dielectric body 70.

In addition, the dielectric body 70 may have the terminal installation hole 77, which is a hollow space permitting vertical communication at the center thereof and substantially equipped with the terminal section 40.

The dielectric body 70 may further include a lower inner dielectric 73 formed integrally with the other terminal 60 of the terminal section 40 by injection molding, and an upper inner dielectric 72 formed integrally with one terminal 50 of the terminal section 40 by injection molding.

The lower inner dielectric 73 may have a terminal through-hole 73a, which is formed when it is formed integrally with the other terminal 60 by injection molding and permits passage of the other terminal 60. Likewise, the upper inner dielectric 72 may have a terminal through-hole 72a, which is formed when it is formed integrally with one terminal 50 by injection molding and permits passage of one terminal 50.

The upper inner dielectric 72 may be formed to support and surround a portion of the outer peripheral surface of one terminal 50, and the lower inner dielectric 73 may be formed to support and surround a portion of the outer peripheral surface of the other terminal 60.

However, the dielectrics 72 and 73 are not necessarily manufactured integrally with the respective terminals 50 and 60 of the terminal section 40 by injection molding.

That is, the upper and lower inner dielectrics 72 and 73 may be separately formed to have the respective terminal through-holes 72a and 73a and may be inserted into the terminal installation hole 77 for assembly.

The upper internal dielectric 72 may be disposed to achieve impedance matching in the terminal insertion port 25, and may be preferably spaced apart from the dielectric body 70 so as to be vertically movable relative to the other fixed terminal 60 corresponding to one terminal 50. The lower internal dielectric 73 may be disposed to achieve impedance matching in the terminal installation hole 77, and may be in contact with the dielectric body 70 so as to easily fix the other terminal 60.

The dielectric body 70, the lower inner dielectric 73, and the upper inner dielectric 72 described above may be designed individually or in combination with each other to suit the overall impedance matching in the filter body 21.

Meanwhile, a second elastic member installation end may be formed at the upper portion of the terminal installation hole 77 of the dielectric body 70. The second elastic member installation end 74 may be stepped to be larger than the diameter of the terminal installation hole therearound so that an edge end of a second elastic member 80B of the elastic member 80A/80B to be described later is installed at and supported by the second elastic member installation end 74. Hereinafter, for convenience, a space in which the lower end of one terminal 50 is located will be defined and described as a terminal installation groove 76. Assuming that the second elastic member installation end 74 is referred to a portion stepped smaller than the terminal installation groove 76, the terminal installation groove 76 may be referred to as a portion stepped larger than the second elastic member installation end 74.

Lower support ends 85b of the second elastic member 80B of the elastic member 80A/80B according to another embodiment may be installed in contact with the bottom of the second elastic member installation end 74. This will be described in more detail later.

In addition, around the terminal installation hole 77 positioned higher than the bottom of the terminal installation groove 76, the first elastic member installation end 78 may be stepped to have a diameter larger than the diameter of the second elastic member installation end 74. A first elastic member 80A of the elastic member 80A/80B according to the embodiment may be installed at the first elastic member installation end 78. This will be described in more detail later.

Figure 9:
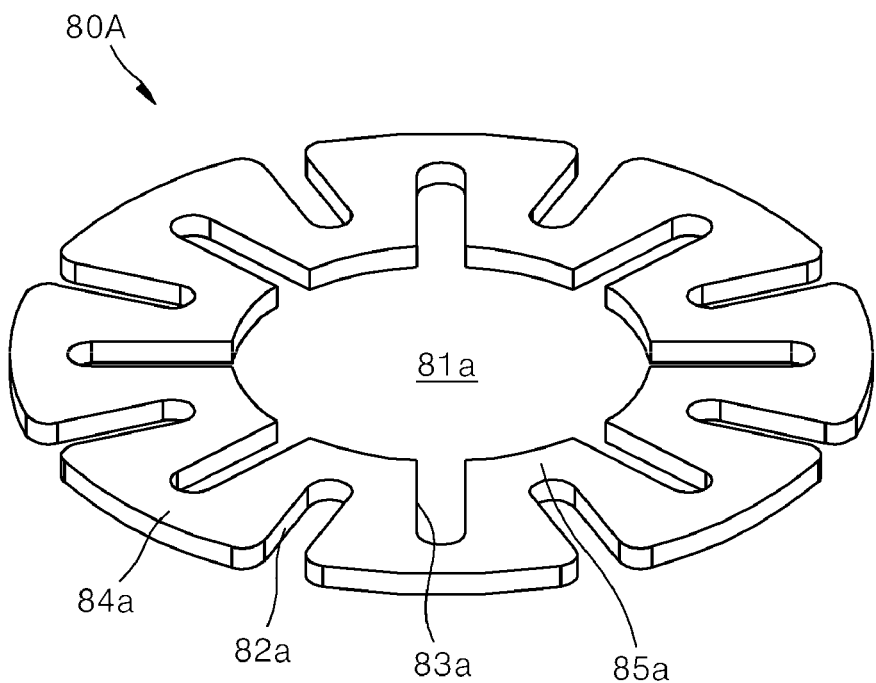
FIG. 9 is a perspective view illustrating an elastic member according to the embodiment in the configuration of FIG. 4.
Figure 10:
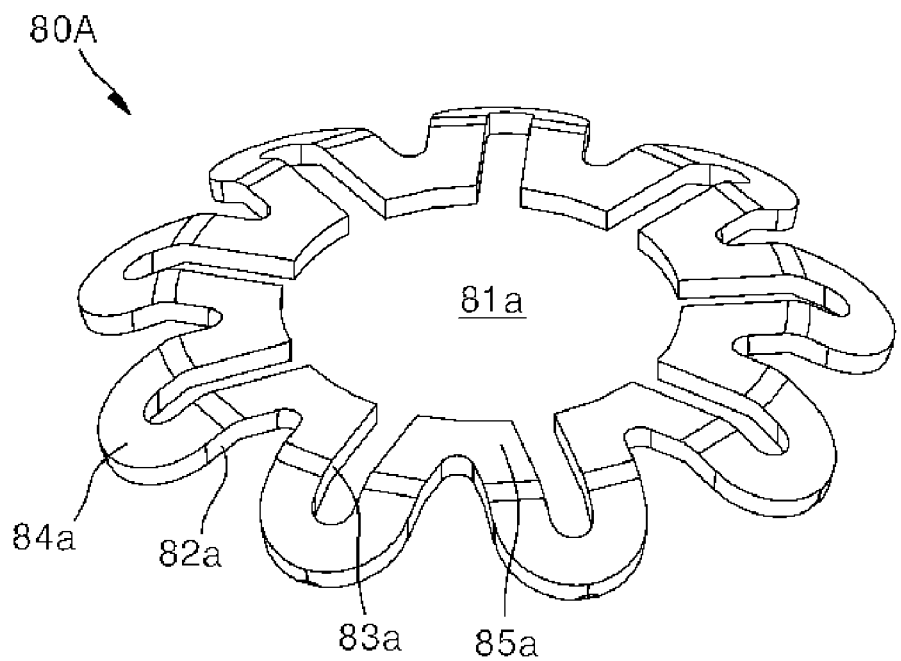
FIG. 10 is a perspective view illustrating a modification of the elastic member of FIG. 9.
Figure 11:
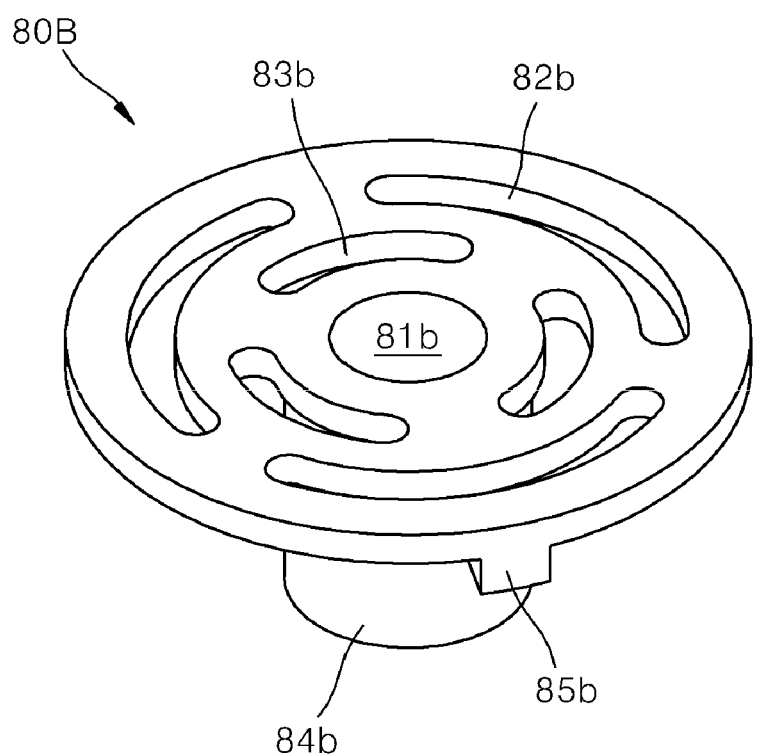
FIG. 11 is a perspective view illustrating an elastic member according to another embodiment in the configuration of FIG. 4.

FIG. 9 is a perspective view illustrating the elastic member according to the embodiment in the configuration of FIG. 4. FIG. 10 is a perspective view illustrating a modification of the elastic member of FIG. 9. FIG. 11 is a perspective view illustrating the elastic member according to another embodiment in the configuration of FIG. 4. FIG. 12 is a partial cross-sectional view of FIG. 3 where the elastic member of FIG. 11 is provided.

As illustrated in FIGS. 5 to 12, the cavity filter 20 according to the embodiment of the present disclosure may further include the elastic member 80A/80B having an edge whose portion is supported by the dielectric body 70. The elastic member 80A/80B elastically supports the terminal section 40 by means of an operation in which a hollow portion 81a/81b of the elastic member 80A/80B is vertically deformed relative to the portion of the edge when an assembly force is applied to the terminal section 40 supported to pass through the hollow portion 81a/81b.

Here, the elastic member 80A/80B may be made of one of beryllium copper (BeCu), stainless steel (SUS), and spring steel. The elastic member 80A/80B may be made of silicone of materials typically used therefor. However, silicone may cause a deterioration in elasticity due to a predetermined compression reduction ratio after a long period of use, resulting in a deterioration in long-term reliability of the cavity filter.

Accordingly, in the cavity filter 20 according to the embodiment of the present disclosure, the elastic member 80A/80B is made of, instead of silicone, one of the above-mentioned beryllium copper, stainless steel, and spring steel that are usable for a long period of time to secure long-term reliability while decreasing a degradation of compression reduction ratio although its own elasticity is low.

As illustrated in FIGS. 9 and 10, the elastic member 80A/80B may include the first elastic member 80A in the form of a disk, having a hollow portion 81a, a plurality of outer edges 84a supported by the first elastic member installation end 78, and a plurality of inner edges 85a to which one terminal 50 of the terminal section 40 is latched.

As illustrated in FIG. 9, the first elastic member 80A may be configured such that the outer edges 84a and the inner edges 85a are separated by outer cuts 82a each formed by cutting a predetermined length toward the hollow portion 81a from the outer peripheral surface of the elastic member and inner cuts 83a each formed by cutting a predetermined length toward the outer peripheral surface of the elastic member from the hollow portion 81a, respectively.

Accordingly, the outer edges 84a are separated by the outer cuts 82a, and the inner edges 85a are separated by the inner cuts 83a. At the same time, the first elastic member 80A may be in the form of a zigzag ring in which each of the outer edges 84a and an adjacent one of the inner edges 85a are interconnected.

When an assembly force is applied to the first elastic member 80A through one terminal 50 of the supported terminal section 40, the inner edges 85a are elastically deformed downward with respect to the outer edges 84a supported by the second elastic member installation end 74, thereby elastically supporting the terminal section 40.

That is, as illustrated in FIG. 7A, when no external force such as an assembly force is applied to the outer and inner edges 84a and 85a of the first elastic member 80A, the terminal section 40 is supported in parallel with a connection portion connecting the outer and inner edges. Then, as illustrated in FIG. 7B, when an external force such as a predetermined assembly force is applied to the first elastic member 80A, the inner edges 85a together with the terminal section 40 is moved downward in a direction in which the assembly force is applied, and the connection portion connecting the outer and inner edges 84a and 85a is deformed in shape so as to be inclined inward and downward, thereby elastically supporting the terminal section 40.

However, in the cavity filter 20 according to the embodiment of the present disclosure, the first elastic member 80A should not be limited to the shapes of FIGS. 7A, 7B, and 9.

That is, as illustrated in FIGS. 8A, 8B, and 10, the first elastic member 80A may be configured such that the outer edges 84a are bent outward at a predetermined angle with respect to the inner edges 85a. Making the support surfaces of the outer and inner edges 84a and 85a deviate from each other is to add a more reliable elastic force than making the support surfaces parallel as illustrated in FIGS. 7A, 7B, and 9.

However, since the modification of the first elastic member 80A illustrates that the outer edges 84a are bent with respect to the inner edges 85a, it is required that no crack and overall dimension change occur in the bent portion therebetween.

In addition, as illustrated in FIGS. 8A and 8B, when the filter body 21 provided with the modified first elastic member 80A is pressed against the electrode pad of the external member 8 to provide a predetermined assembly force, it is possible to secure a robust support force for the first elastic member installation end 78 by the bent outer edges 84*a*.

Meanwhile, as illustrated in FIG. 11, the elastic member may further include the second elastic member 80B in the form of a disk, having an elastic part (no reference numeral) provided with a hollow portion 81*b* and a plurality of lower support ends 85*b* supported by the second elastic member installation end 74, and a boss 84*b* extending downward from the elastic part so as to surround the outer peripheral surface of one terminal 50 of the terminal section 40 passing through the hollow portion 81*b*.

As illustrated in FIG. 11, the second elastic member 80B may be elastically deformed by a plurality of inner elastic cuts 83*b* circumferentially arranged and each vertically formed around the hollow portion 81*b* and a plurality of outer elastic cuts 82*b* circumferentially arranged and each vertically formed around the inner elastic cuts 83*b*.

When an assembly force is applied to the second elastic member 80B through one terminal 50 of the supported terminal section 40, the inner edge of the elastic part at which the hollow portion 81*b* is located is elastically deformed downward with respect to the edge of the elastic part supported by the second elastic member installation end 74, thereby elastically supporting the terminal section 40.

When a contact portion 53, which is the tip of one terminal 50 of the terminal section 40, is pressed against and assembled to the electrode pad of the external member 8 through the elastic support action of the elastic member 80A/80B, the elastic member is elastically deformed to eliminate the assembly tolerance existing in the terminal insertion port 25 as described above, and then applies an elastic force to one terminal 50 of the terminal section 40 such that the contact portion 53 of one terminal 50 is continuously in contact with the electrode pad.

Meanwhile, the smaller the contact area of the contact portion 53 in contact with the antenna board or the PCB 8, the better one terminal 50 becomes. Accordingly, the contact portion 53, which is the tip of one terminal 50, may have a conical shape whose width becomes narrower upward, as illustrated in FIGS. 4 to 12.

When the assembler provides an assembly force by means of an operation in which the contact portion 53 as the tip of one terminal 50 comes into contact with the electrode pad of the external member 8, one terminal 50 may be movable up and down on the drawing in the terminal insertion port 25 by the elastic member 80A/80B.

In addition, the lower end 52 of one terminal 50 into which the upper end of the other terminal 60 is inserted may be provided with a plurality of tension cuts 55 that are vertically elongated. The tension cuts 55 may be formed to divide the lower end 52 of one terminal 50 in the form of a hollow tube into a plurality of pieces.

The tension cuts 55 serve to add the above-mentioned lateral tension by allowing the lower end 52 of one terminal to be pressed against the outer circumference of the upper end 61 of the other terminal 60 accommodated therein. Since the dielectric body 70 is provided to inwardly support the outer peripheral surface of one terminal 50 on which the tension cuts 55 are formed, the inner surface of the lower end 52 of the one terminal 50, which is cut by the tension cuts 55, is always in close contact with the outer peripheral surface of the upper end 61 of the other terminal 60 accommodated therein.

The addition of the lateral tension by the tension cuts 55 as described above can prevent the interruption of electrical flow between two separated terminals of the terminal section 40 in advance.

On the other hand, the tip of the other terminal 60 of the terminal section 40 may have a pointed shape such that it is easily inserted into the hollow tube of one terminal 50, and the lower end of the other terminal 60 may be fixed to the above-mentioned RF signal connector.

Accordingly, when one terminal 60 is moved downward by the assembly force with the lower end of the other terminal 60 fixed to the RF signal connector, the other terminal 60 is inserted further deeply into the lower end 52 in the form of a hollow tube of one terminal 50, with the consequence that the assembly tolerance existing in the terminal insertion port 25 can be absorbed by extending and contracting the vertical length of the terminal section 40 as a whole.

Meanwhile, as illustrated in FIGS. 7A, 8A, 8B, and 12, when no assembly force is provided, one terminal 50 may be configured such that the contact portion 53 has a height to protrude higher than the support ends 92 of the star washer 90.

The assembly tolerance absorption process according to the assembly of the cavity filters 20 according to the embodiment of the present disclosure having such a configuration will be described with reference to the accompanying drawings (in particular, FIGS. 6 and 9).

First, as illustrated in FIGS. 7A to 8B and 10, the cavity filters 20 according to the embodiment of the present invention are pressed against one surface of the external member 8 such as the antenna board or the PCB having with the electrode pad, and the fastening members (not shown) are then fastened to the assembly holes, in order to apply a predetermined assembly force to the cavity filters 20. However, it is not necessary to press the cavity filters 20 against one surface of the antenna board or the PCB 8. On the contrary, it is also possible to apply an assembly force by pressing one surface of the external member 8 such as the antenna board or the PCB against the cavity filters 20 arranged at predetermined intervals.

Then, the distance between the antenna board or the PCB 8 and each of the cavity filters 20 according to the embodiment of the present disclosure is reduced, and at the same time, the support ends 92 of the star washer 90 is deformed in shape by the above-mentioned fastening force. As a result, the assembly tolerance existing between the antenna board or the PCB 8 and the cavity filter 20 according to the embodiment of the present disclosure is primarily absorbed.

At the same time, by means of the elastic support operation of the elastic member 80A/80B while one terminal 50 of the terminal section 40 is pressed by one surface of the external member 8 such as the antenna board or the PCB so as to move a predetermined distance to the other terminal 60 in the terminal insertion port 25, the assembly tolerance existing in the terminal insertion port 25 of the cavity filter 20 according to the embodiment of the present disclosure is secondarily absorbed.

In this case, the interruption of electrical flow between one terminal 50 and the other terminal 60 can be prevented since the lateral tension is added by tension cuts 55 to the upper end of the other terminal 60 inserted into the lower end in the form of a hollow tube of one terminal 50. Therefore, it is possible to prevent the signal performance degradation of the cavity filter 20 according to the embodiment of the present disclosure.

While one or more exemplary embodiments have been described with reference to the accompanying drawings, it is to be understood by those skilled in the art that various modifications and changes in form and details can be made therein without departing from the spirit and scope as defined by the appended claims.

Accordingly, the embodiments disclosed herein are intended to illustrate, rather than to limit, the technical ideas of the present disclosure, and it is therefore obvious that the scope of the technical ideas of the present disclosure is not limited by these embodiments. Various modifications and specific embodiments that can be easily inferred by those skilled in the art within the scope of the technical ideas included in the specification and drawings of the present disclosure should be interpreted as falling within the scope of the present disclosure.

INDUSTRIAL APPLICABILITY

Exemplary embodiments of present disclosure provide a cavity filter having an RF signal connection structure that is easy to mount and keeps filter's frequency characteristics uniform while ensuring an assembly method illustrating an of minimizing a cumulative amount of assembly tolerances caused when assembling a plurality of filters.

The invention claimed is:

1. A cavity filter comprising:
an RF signal connector spaced apart at a predetermined distance from an external member having an electrode pad on one surface thereof;
a terminal section configured to electrically connect the electrode pad of the external member to the RF signal connector and to absorb an assembly tolerance existing at the predetermined distance while preventing an interruption of electrical flow between the electrode pad and the RF signal connector;
a dielectric body inserted into a terminal insertion port to surround the terminal section; and
an elastic member having an edge whose portion is supported by the dielectric body, the elastic member being configured to elastically support the terminal section by means of an operation in which a hollow portion of the elastic member is vertically deformed relative to the portion of the edge when an assembly force is applied to the terminal section supported to pass through the hollow portion,
wherein the terminal section comprises:
one terminal coming into contact with the electrode pad; and
another terminal connected to the RF signal connector.

2. The cavity filter according to claim 1, wherein the terminal section is inserted into the terminal insertion port formed in a filter body having the RF signal connector therein through the dielectric body.

3. The cavity filter according to claim 2, wherein the dielectric body comprises an upper inner dielectric provided to surround a portion of an outer peripheral surface of the one terminal passing through a terminal installation hole provided as a hollow space, and a lower inner dielectric provided to surround a portion of an outer peripheral surface of the another terminal passing through the terminal installation hole.

4. The cavity filter according to claim 3, wherein the dielectric body comprises one of a second elastic member installation end formed to be larger than a diameter of a peripheral hole to support the edge of the elastic member, and a first elastic member installation end stepped to be larger than a diameter of the second elastic member installation end.

5. The cavity filter according to claim 4, wherein the elastic member comprises:
a first elastic member in the form of a disk, the first elastic member comprising a hollow portion, a plurality of outer edges supported by one of the first and second elastic member installation ends, and a plurality of inner edges to which the one terminal of the terminal section is latched; and
a second elastic member in the form of a disk, the second elastic member comprising an elastic part having a hollow portion and a plurality of lower support ends supported by one of the first and second elastic member installation ends, and a boss extending downward from the elastic part so as to surround the outer peripheral surface of the one terminal of the terminal section passing through the hollow portion.

6. The cavity filter according to claim 5, wherein the first elastic member is configured such that the outer and inner edges are separable by outer cuts, each formed by cutting a predetermined length toward the hollow portion from an outer peripheral surface of the first elastic member, and inner cuts, each formed by cutting a predetermined length toward the outer peripheral surface from the hollow portion, respectively.

7. The cavity filter according to claim 6, wherein the first elastic member is configured such that the outer edges are bent outward at a predetermined angle with respect to the inner edges.

8. The cavity filter according to claim 5, wherein the second elastic member is elastically deformable by a plurality of inner elastic cuts circumferentially arranged and each vertically formed around the hollow portion and a plurality of outer elastic cuts circumferentially arranged and each vertically formed around the inner elastic cuts.

9. The cavity filter according to claim 1, wherein the elastic member is made of one of beryllium copper (BeCu), stainless steel (SUS), and spring steel.

10. The cavity filter according to claim 1, wherein either of the one terminal and the another terminal comprises a plurality of tension cuts vertically elongated.

11. The cavity filter according to claim 10, wherein the tension cuts are provided in the one terminal, and an upper end of the another terminal is accommodated in a lower end of the one terminal.

12. The cavity filter according to claim 10, wherein the tension cuts are provided in the another terminal, and a lower end of the one terminal is accommodated in an upper end of the another terminal.

13. The cavity filter according to claim 10, wherein the dielectric body supports an outer peripheral surface of the one terminal or the another terminal in which the tension cuts are formed.

14. The cavity filter according to claim 1, wherein a contact portion of the one terminal of the terminal section, which is in contact with the electrode pad, has a rounded conical shape to have a predetermined contact area at its upper end.

15. The cavity filter according to claim 1, wherein a contact portion of the one terminal of the terminal section, which is in contact with the electrode pad, has a rounded hemispherical shape to have a predetermined contact area at its upper end.

* * * * *